US007810515B2

(12) United States Patent
Nies et al.

(10) Patent No.: US 7,810,515 B2
(45) Date of Patent: Oct. 12, 2010

(54) SMART WATER TIMER

(75) Inventors: Juergen Nies, Winchester, VA (US); Ha Van Duong, Winchester, VA (US); Vicky Ann Michael, Winchester, VA (US); Stephen Brass, South Dartmouth, MA (US); Randy McDonald, Franklin, MA (US); David Drury, Lowell, MA (US)

(73) Assignee: Melnor, Inc., Winchester, VA (US)

( * ) Notice: Subject to any disclaimer, the term of this patent is extended or adjusted under 35 U.S.C. 154(b) by 205 days.

(21) Appl. No.: 12/046,923

(22) Filed: Mar. 12, 2008

(65) Prior Publication Data
US 2008/0255708 A1 Oct. 16, 2008

Related U.S. Application Data

(60) Provisional application No. 60/906,819, filed on Mar. 14, 2007, provisional application No. 60/942,763, filed on Jun. 8, 2007.

(51) Int. Cl.
*F16K 31/02* (2006.01)
*F16K 31/48* (2006.01)
*G05B 11/00* (2006.01)
*A01G 25/00* (2006.01)
*A01G 27/00* (2006.01)
*B05B 12/08* (2006.01)
*G01R 27/26* (2006.01)
*G08B 1/08* (2006.01)
*G05D 7/00* (2006.01)

(52) U.S. Cl. .................. 137/78.3; 137/624.11; 239/63; 239/69; 239/70; 251/129.01; 324/664; 340/539.22; 340/539.26; 340/539.3; 340/602; 700/284

(58) Field of Classification Search .................. 700/275, 700/282–284; 702/188; 340/500, 531, 539.1, 340/539.3, 539.22, 539.26, 540, 601, 602; 324/663, 664, 658; 239/63, 64, 67, 69, 70, 239/723; 251/129.01, 129.04; 137/78.1–78.3, 137/624.11, 624.18
See application file for complete search history.

(56) References Cited

U.S. PATENT DOCUMENTS 2,578,981 A 12/1951 Parker (Continued)

FOREIGN PATENT DOCUMENTS

DE 3238073 12/1983

(Continued)

OTHER PUBLICATIONS

Gardena Soil Moisture Sensor Operating Instructions (2006).

(Continued)

*Primary Examiner*—Crystal J Barnes-Bullock
(74) *Attorney, Agent, or Firm*—Westerman, Hattori, Daniels & Adrian, LLP

(57) ABSTRACT

A smart water timer which includes a water timer, a receiving unit connected to the water timer, and a moisture sensing unit which is in wireless communication with the receiving unit. The smart water timer can sense when the moisture level in the soil is too moist (based on a user setting) and turn off a water supply to a sprinkler as a result A soil moisture sensing unit is placed in the soil in the area to be watered. The soil moisture sensing unit uses a moisture sensing probe and wirelessly transmits a data signal to the receiver, which is connected to the water timer, indicating whether or not the water timer should be permitted to open a water valve.

19 Claims, 9 Drawing Sheets

U.S. PATENT DOCUMENTS

| Patent No. | | Date | Inventor | Ref |
|---|---|---|---|---|
| 2,911,156 | A | 11/1959 | Freeman | |
| 3,039,698 | A | 6/1962 | Richards | |
| 3,777,976 | A | 12/1973 | Milovancevic | |
| 4,190,884 | A | 2/1980 | Medina | |
| 4,304,989 | A | 12/1981 | Vos et al. | |
| 4,396,149 | A | 8/1983 | Hirsch | |
| 4,541,563 | A | 9/1985 | Uetsuhara | |
| 4,545,396 | A | 10/1985 | Miller et al. | |
| 4,799,142 | A | 1/1989 | Waltzer et al. | |
| 4,838,310 | A | 6/1989 | Scott et al. | |
| 4,852,802 | A * | 8/1989 | Iggulden et al. | 239/64 |
| 4,922,433 | A | 5/1990 | Mark | |
| 4,937,732 | A | 6/1990 | Brundisini | |
| 4,993,640 | A | 2/1991 | Baugh | |
| 5,038,268 | A | 8/1991 | Krause et al. | |
| 5,060,859 | A | 10/1991 | Bancroft | |
| 5,148,985 | A | 9/1992 | Bancroft | |
| 5,207,380 | A | 5/1993 | Harryman | |
| 5,333,785 | A | 8/1994 | Dodds et al. | |
| 5,424,649 | A | 6/1995 | Gluck et al. | |
| 5,445,176 | A * | 8/1995 | Goff | 137/80 |
| 5,464,044 | A | 11/1995 | Brinkerhoff | |
| 5,479,338 | A | 12/1995 | Ericksen et al. | |
| 5,570,030 | A | 10/1996 | Wightman | |
| 5,651,500 | A | 7/1997 | Patterson et al. | |
| 5,813,606 | A | 9/1998 | Ziff | |
| 6,016,971 | A * | 1/2000 | Welch et al. | 239/63 |
| 6,079,433 | A * | 6/2000 | Saarem | 137/1 |
| 6,098,898 | A * | 8/2000 | Storch | 239/69 |
| 6,259,970 | B1 | 7/2001 | Brundisini | |
| 6,378,838 | B1 | 4/2002 | Brundisini | |
| 6,452,499 | B1 | 9/2002 | Runge et al. | |
| 6,782,311 | B2 * | 8/2004 | Barlow et al. | 700/284 |
| 6,938,834 | B2 * | 9/2005 | Harris | 239/67 |
| 7,050,887 | B2 * | 5/2006 | Alvarez | 700/284 |
| 7,063,270 | B2 | 6/2006 | Bowers et al. | |
| 7,133,749 | B2 | 11/2006 | Goldberg et al. | |
| 7,168,632 | B2 * | 1/2007 | Kates | 239/69 |
| 7,170,302 | B2 | 1/2007 | Lee | |
| 7,216,659 | B2 * | 5/2007 | Caamano et al. | 137/1 |
| 7,258,129 | B1 | 8/2007 | Donahoo | |
| 2002/0100814 | A1 * | 8/2002 | Pollak et al. | 239/63 |
| 2005/0090936 | A1 * | 4/2005 | Hitt et al. | 700/284 |
| 2005/0240313 | A1 | 10/2005 | Cartwright | |
| 2006/0049271 | A1 | 3/2006 | Hitt | |
| 2006/0054214 | A1 | 3/2006 | Caamano et al. | |
| 2007/0106426 | A1 | 5/2007 | Ensworth et al. | |
| 2007/0209702 | A1 | 9/2007 | Donahoo | |
| 2007/0273394 | A1 * | 11/2007 | Tanner et al. | 324/664 |
| 2007/0284552 | A1 * | 12/2007 | Khorshid | 251/129.04 |
| 2008/0136630 | A1 * | 6/2008 | Leggett et al. | 340/541 |
| 2008/0251602 | A1 * | 10/2008 | Leggett et al. | 239/69 |
| 2009/0126801 | A1 * | 5/2009 | Grill et al. | 137/78.3 |

FOREIGN PATENT DOCUMENTS

| | | |
|---|---|---|
| GB | 2132767 | 7/1984 |
| WO | WO 87/04275 | 7/1987 |
| WO | WO 2004/109238 A1 | 12/2004 |

OTHER PUBLICATIONS

Search Report issued Jul. 1, 2008 in European counterpart application EP 08 40 5076.

* cited by examiner

SMART WATER TIMER

BACKGROUND OF INVENTION

The following description sets forth the inventor's knowledge of related art and problems therein and should not be construed as an admission of knowledge in the prior art.

In the area of lawn watering, lawn sprinklers have been known and used for years. For example, square oscillating sprinklers have been used along with a water hose to water a given area of lawn. To make watering a lawn more convenient, programmable timers have also been known. A programmable timer can be used to set the time at which the lawn is to be watered. In a typical setup, a programmable timer is connected to a water source on one end and a hose, which is connected to a lawn sprinkler, on the other end. A user could then program or set the water timer, and the lawn sprinkler would come on at the pre-designated time intervals.

One drawback of this system is that if the soil is already moist and does not need to be watered, a conventional water timer cannot adjust accordingly, and simply turns on according to its pre-programmed watering cycle and waters the lawn when it is not needed. This may cause damage to the lawn and at a minimum, is a waste of water. For example, if the lawn has just received an extensive amount of water due to a rainstorm, a conventional water timer would simply turn on the sprinkler, regardless of the moisture content of the soil.

Another drawback of this system is if the soil is already moist due to excessive watering by the lawn sprinkler itself, the timer will stay on according to its pre-programmed watering cycle and the lawn sprinkler will continue watering the lawn, despite the moisture level of the soil.

SUMMARY OF THE INVENTION

One object of the present invention is to provide a smart water timer which overcomes the above-mentioned disadvantages. As such, the smart water timer comprises a water timer, a receiving unit, and a moisture sensing unit which is in wireless communication with the receiving unit. The receiving unit is also in communication with the water timer.

A moisture sensing unit measures the soil moisture content of a soil and transmits a message to the receiving unit indicating whether or not the timer should be allowed to be in an "on" state; that is, be in a state where the timer is allowed to open its water valve, thereby turning on a lawn sprinkler. If the moisture level of the soil is higher than the moisture level threshold previously selected by a user, then the soil moisture sensor will transmit a message to the receiving unit indicating that the water timer should turn off (if the water timer is already on), or not turn on at all. If the moisture level of the soil is lower than the moisture level threshold previously selected by a user, then the soil moisture sensor will transmit a message to the receiving unit indicating that it is ok for the water timer to turn on.

The water timer can have a plurality of water valves, each one of which can be associated with a different soil moisture sensor. The water timer can also be configured to have a receiving unit built into the timer. This reduces the number of parts needed for the smart water timer system.

The soil moisture sensing unit may include a soil moisture sensor, a transmitter or transceiver which is in communication with the receiving unit and an adjustment mechanism which allows a user to select a desired soil moisture content of the soil. The soil moisture sensor may be of a capacitive variety, although other types of sensors will also work.

The transmitter or transceiver of the soil moisture sensor can transmit a radio wave to the receiving unit, which has a receiver or transceiver, indicating whether or not the soil needs more water. The soil moisture sensor can also have a display means, such an LED or the like.

BRIEF DESCRIPTION OF THE DRAWINGS

One embodiment of the present invention will be described with reference to the accompanying drawings, wherein.

DETAILED DESCRIPTION OF THE DRAWINGS

An embodiment of the present invention will now be described with reference to the drawings.

Figure 1:
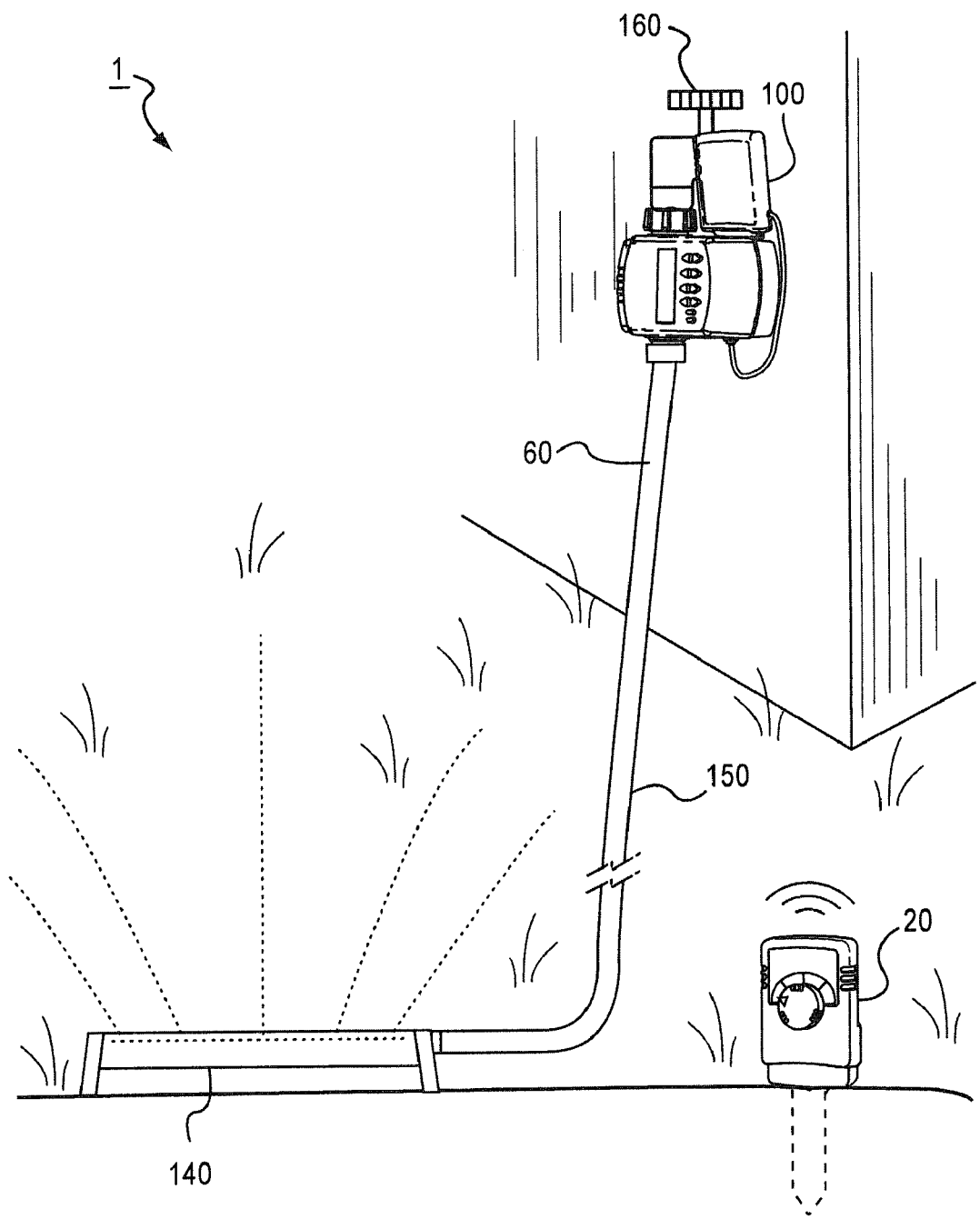
FIG. 1 is a system view of the smart water timer.

FIG. 1 is a system view of a first embodiment of a smart water timer system 1. Smart water timer system 1 comprises water timer 60, receiver unit 100 and soil moisture sensor 20. Soil moisture sensor 20 is shown positioned in the ground within a signal transmitting proximity (e.g. within 200 feet) of receiver unit 100, which is in communication with water timer 60.

As shown in FIG. 1, water timer 60 is connected to water source 160. Water source 160 connects to an input of water timer 60. A garden hose 150 connects the output of water timer 60 to an input of a conventional lawn sprinkler 140. Although an oscillating type lawn sprinkler 140 is shown, any lawn watering device may be used such as a rotary sprinkler, bubbler, drip line, etc.

Water timer 60 is programmable and can be programmed to turn on the oscillating lawn sprinkler 140 at a scheduled interval(s) (e.g. the water timer is "on" during a watering cycle and "off" between watering cycles). Soil moisture sensing unit 20 is positioned on the lawn or area to be watered. Preferably, to obtain a more accurate reading, the soil moisture sensing unit 20 is placed in a position close to the desired watering area. The soil moisture sensing unit 20 is set by a user (described later), to a desired soil moisture level, and transmits a signal to receiver unit 100, based on the desired soil moisture level selected by the user.

The receiver unit 100, receives the signal and sends the signal to water timer 60. Water timer 60 then determines whether or not to open a water valve (e.g., turn on a water supply and thus sprinkler 140), based on the predetermined timer settings and the soil moisture signal received from the soil moisture sensing unit 20.

A more detailed explanation of how the smart water timer works is described below.

Soil Moisture Probe

Figures 2, 3:
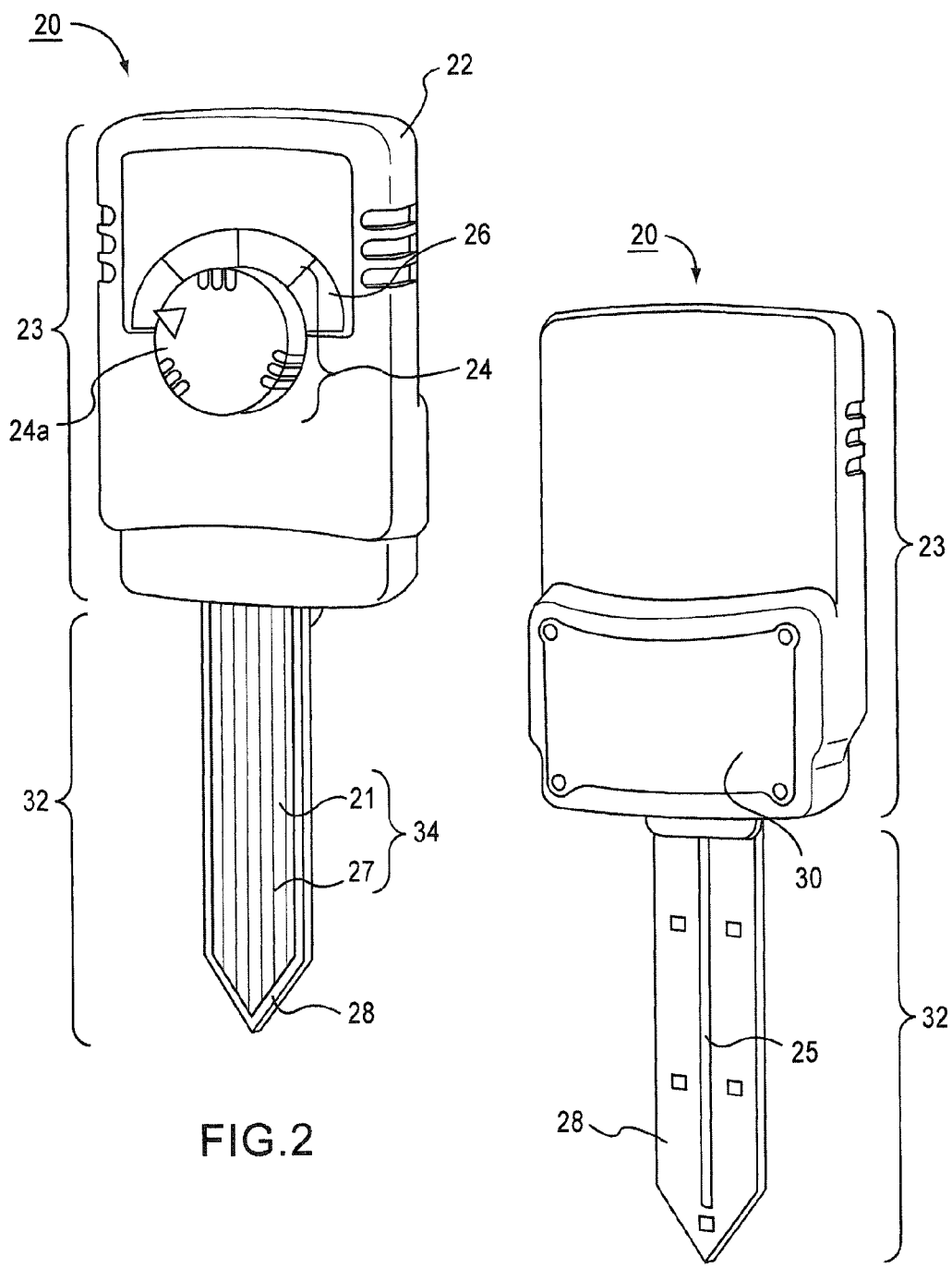
FIG. 2 is a front perspective view of a soil moisture sensor.
FIG. 3 is a rear perspective view of a soil moisture sensor.

FIGS. 2 and 3 illustrate front and rear perspective views of soil moisture sensor 20, respectively. Soil moisture sensor housing 22 contains soil moisture sensor control module 31. Housing 22 includes top portion 23 and bottom portion 32. Top portion 23 contains the logic elements of soil moisture sensor 20, while bottom portion 32 contains the sensor portion of soil moisture sensor 20. A moisture level switch 24 is located on an outside surface of top portion 23 and allows a user to turn on and select a desired moisture level for the soil. For example, a user may adjust control knob 24a to any one of a number of positions, e.g., indicated by adjustment setting positions 26. Although FIG. 2 illustrates a control knob and switch (to select the desired level of moisture), it is generally known that any suitable mechanism which allows for setting the desired moisture level is acceptable. Such a mechanism could include buttons, levers, touch sensors, etc.

Adjustment setting positions 26 may be, for example, off, low, medium and high. However, adjustment setting positions 26 may also include more or less setting positions. In this embodiment, a low setting indicates that a low level of moisture is desired in the soil, a medium setting indicates that a medium level of moisture is desired in the soil, and a high setting indicates that a high level of moisture is desired in the soil.

The moisture of the soil is determined by a capacitive soil moisture probe 34. In the present embodiment, soil moisture probe 34 comprises printed wire board 21 and printed wire board traces 27. However, it is generally known that other types of soil moisture probes can be substituted. Such probes may for example, use the resistance value of the soil to determine a moisture level. Printed wire traces 27 form a capacitor. In a one embodiment, printed wire traces 27 are covered with a water resistant protective layer (not shown), such as plastic or any other suitable material. This prevents the printed wire traces 27 from coming in physical contact with the soil and water, thereby extending the life of the capacitive soil moisture probe 34. Printed wire traces 27 may be formed from copper, platinum or any other suitable conductor. In an alternative embodiment, printed wire traces 27 may be replaced by conductive pads which act as electrodes in the capacitive soil moisture sensor.

Additionally, printed wire traces 27 may be positioned in a horizontal (not shown) as opposed to vertical manner as shown in FIGS. 2 and 3. This allows the soil moisture probe 34 to determine the moisture of the soil at a desired depth. Thus, for example if the user wanted the soil located in the top part of the ground to have a certain moisture level, the user could simply push in the moisture sensor 20 to a desired depth, allowing the soil moisture probe 34 to operate at the appropriate depth.

As described below, the capacitive soil moisture probe 34 works in a simple manner. When the soil is dry, the soil has a low dielectric constant. When the soil is moist, the dielectric constant of the soil increases due to the increase of water in the soil. As the amount of water increases in the soil, the dielectric constant of the soil also increases, which results in a higher capacitance of the capacitor. Thus, the capacitance of the soil moisture probe 34 indicates the moisture content of the soil.

Printed wire board 21 is shown housed in lower portion 32. Lower portion 32 may be configured to have a tapered or spiked end 28 (opposing top portion 23) which allows the printed wire board 21 to be inserted into the soil using its pointed tip, without damaging printed wire board 21. In another embodiment, lower portion 32 may also have a rounded end. Support rib 25, shown in FIG. 3, gives structural support to lower portion 32. As shown in FIG. 3, top portion 23 includes power module compartment 30. Power module compartment 30 is designed to be water tight. Power module compartment 30 may contain batteries, a solar cell or any other system to power moisture sensor 20.

Soil moisture sensor housing 22 is configured to include a water tight seal. Soil moisture sensor housing 22 may be molded of a polymeric material having requisite strength and durability for service under the conditions to be described below. In a preferred embodiment, an ultrasonic welding technique is used when assembling housing 22 in order to seal the internal components, but any other suitable technique such as using seals, gaskets, screws and chemical fasteners, such as epoxy, may also be used.

Figure 4:
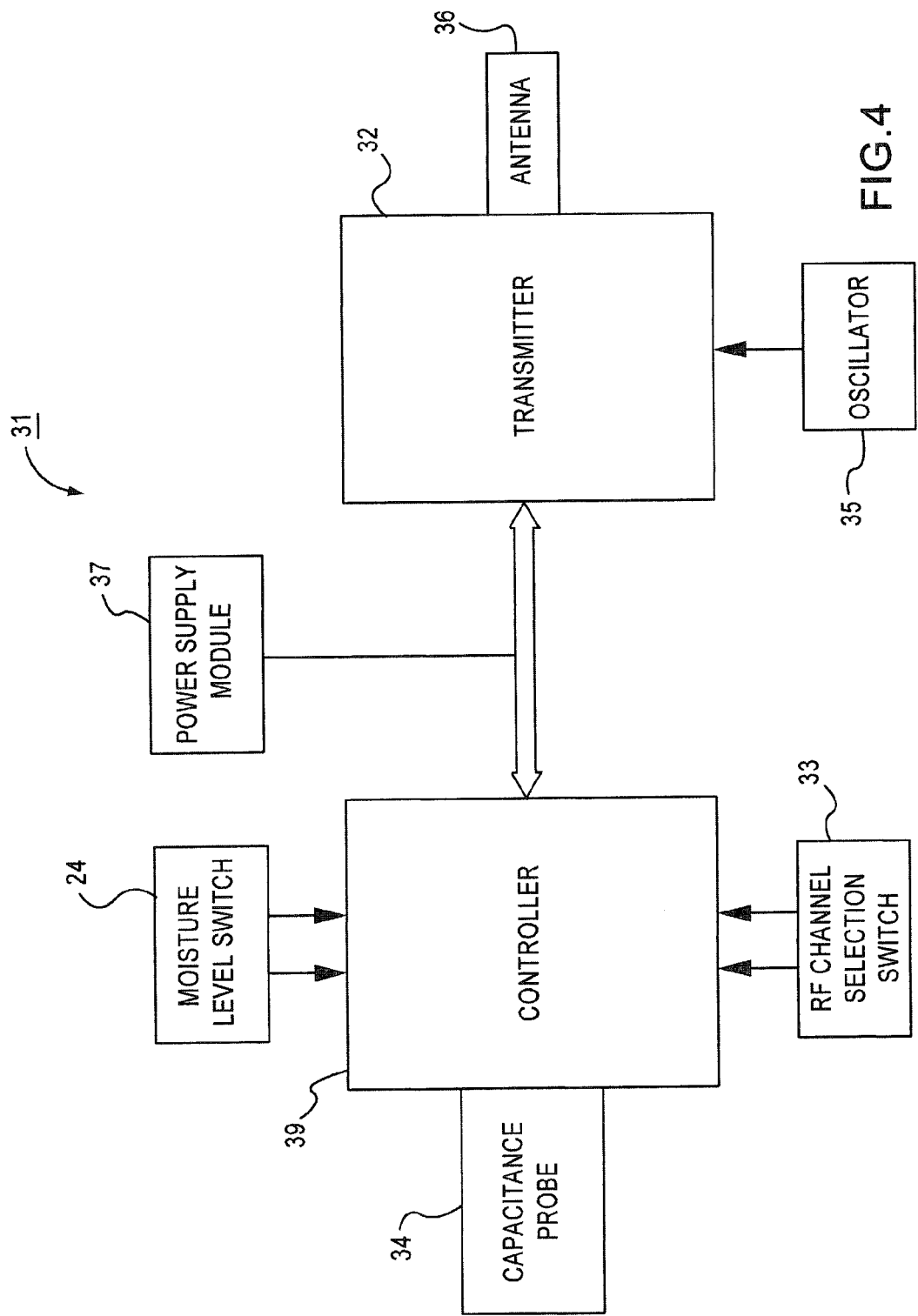
FIG. 4 is a block diagram of a soil moisture sensor control module.

A block diagram of soil moisture sensor control module 31 is shown in FIG. 4. The operation of the soil moisture sensor control module 31 is described below. A capacitance probe 34 measures the capacitance of the soil. The measured value is input into controller 39. Controller 39 may be a microprocessor such as Texas Instruments Controller MSP430F2011, or any other suitable device.

Controller 39 receives the selected moisture level input, determined from moisture level switch 24 (described above). Controller 39 compares the data received from the capacitance probe 34 and moisture level input determined from the moisture level switch 24. If controller 39 determines that there is too much moisture in the soil, then controller 39 instructs the transmitter 32 to send a signal to the water timer 60, for example, indicating that it should turn off or remain off.

Each different switch setting of moisture level switch 24 may be connected to a different combination of inputs of controller 39. If a low level of moisture is selected, this will be connected to a specific input(s) of controller 39. If a medium level of moisture is selected, this will be connected to a different input(s) of controller 39. If a high level of moisture is selected, this will be connected to a different input(s) of controller 39. This allows controller 39 to determine the desired moisture setting.

In the present embodiment, there are four adjustment setting positions 26 (shown in FIG. 2, i.e., off, low, medium and high). The value indicated by the moisture level switch 24 is based on a preset scale. However, if the moisture level switch is set to the off position, then the soil moisture sensor 20 does not operate and a signal is never sent to water timer 60. As discussed later, the water timer 60 then operates in default mode and does not receive any input from receiver unit 100.

In one embodiment, if the moisture level switch 24 is set to "low," then the water in the soil is desired to be approximately between 25% and 45% by weight, (on a scale of 0% to 100%, wherein 0% is no water in the soil and 100% is total water). If the moisture level switch 24 is set to "medium," then the water in the soil is desired to be between 50% and 70% by weight. If the moisture level switch 24 is set to "high," then the water in the soil is desired to be between 70% and 90% by weight. It is noted that these set values may be changed to any particular values and are not limited to the ones recited above.

If the moisture level switch 24 is set to any of the "on" positions, then once the controller 39 makes a determination of whether or not the soil is too moist (e.g., exceeds predetermined threshold), a signal is transmitted to receiver 60. This is done with transmitter 32. Transmitter 32 is connected to controller 39 and may be, for example, an Integration Association FSK IA 4221 transmitter. Other appropriate transmitters or transceivers may also be used. A crystal oscillator 35 may also be used in conjunction with transmitter 32. Antenna 36 is used to improve the gain of the transmitted signal. Power supply module 37 powers the soil moisture sensor control module 31.

A transmitter and receiver may be paired together so that they operate on the same frequency. This pairing may be done at the place the units are made. This way, a user may simply install and power-up the units and they will recognize each other as they are both paired together. This avoids interference with other units used within an overlapping transmitting proximity. Alternatively, the transmitter 32 may have an RF selection switch (not shown), in which a particular broadcast frequency may be chosen. This could help ensure that if two broadcast unit are operating in an overlapping broadcast area, the signals would not interfere with each other as the RF switch on each unit could be set to transmit on a different frequency.

Figure 5:
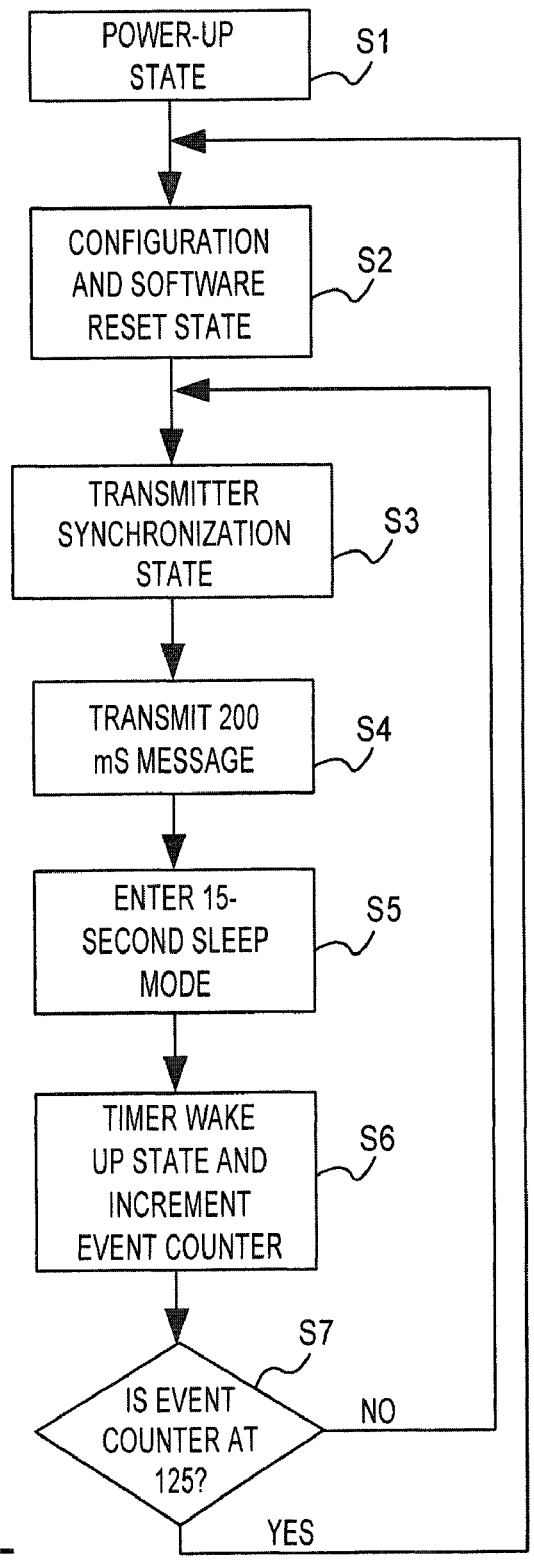
FIG. 5 is a flowchart of an operation sequence of a transmitter within a soil moisture sensor.

An operating state of transmitter 32 is shown in FIG. 5. Step 1 begins the process with a power-up state. In step 2, the software of the transmitter is reset. In step 3, the transmitter synchronizes with the receiver unit 100. The synchronization step allows the receiver unit 100 and water timer 60 to prepare for an incoming data message. In step 4, a data message is transmitted. In the present embodiment, the transmitted message may for example last for approximately 200 ms (with some wait-time occurring between the synchronization step and the data message transmission). The transmitted message could be as simple as a yes or no; that is, allow the timer to come on, or not allow the timer to come on.

This simple yes or no, on or off message allows for a brief period of transmission time. That is, very few data bits need to be sent. In fact, a minimum of 1 data bit may be sent; a simple 1 or 0 representing on or off. The on or off signal indicates whether or not the timer should be allowed to turn on, or if the timer is already on, whether or not the timer should turn off. This saves power and promotes battery life. Transmitting a moisture value of the soil can also be used, but requires transmitting much more data, thereby increasing transmission time. Furthermore, with this increase in transmission time, more transmission energy will be used, thereby shortening battery life.

After the message has been transmitted, the transmitter enters a 15 second sleep mode in step 5 (e.g., it is known that the sleep mode can be set to more or less than 15 seconds). Thus, the transmitter may only transmit for approximately 200 ms out of every 15 seconds. This amounts to the transmitter transmitting for only 1.33% of the time. This allows the transmitter to conserve energy and battery power. As such, the battery life of battery 31 can be greatly extended.

After the 15 second sleep mode, transmitter 32 wakes up in step 6 and increments an event counter. At step 7 a decision is made as to whether or not the event counter has reached 125. If the event counter has reached 125, the process repeats again, starting from step 2. If the event counter has not reached 125, the process repeats again starting from step 3.

Figure 6:
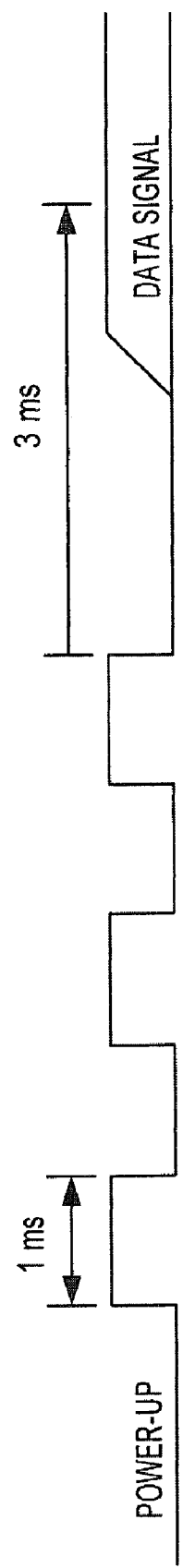
FIG. 6 is a timing diagram of a transmit sequence of a transmitter in a soil moisture sensor.

FIG. 6 is a timing diagram of a transmitted signal from transmitter 32. As shown in FIG. 6, upon power-up of the transmitter 32, three 1 ms pulses are sent. This allows the transmitter 32 and receiver 114 (described later) to synchronize. Next, after a predetermined amount of time, a data signal is sent to the receiver 114. The data signal indicates whether or not the water timer 60 should be allowed to turn on. For example, if the user selected a low moisture setting and the soil is moist, then soil moisture sensor 20 will transmit a signal indicating that water timer 60 should not be allowed to turn on.

Conversely, if the user selects a low setting of the desired soil moisture content and the soil is dry, then soil moisture sensor 20 will transmit a signal indicating that the water timer 60 should be allowed to turn on a water supply.

Receiver Unit

Figure 7:
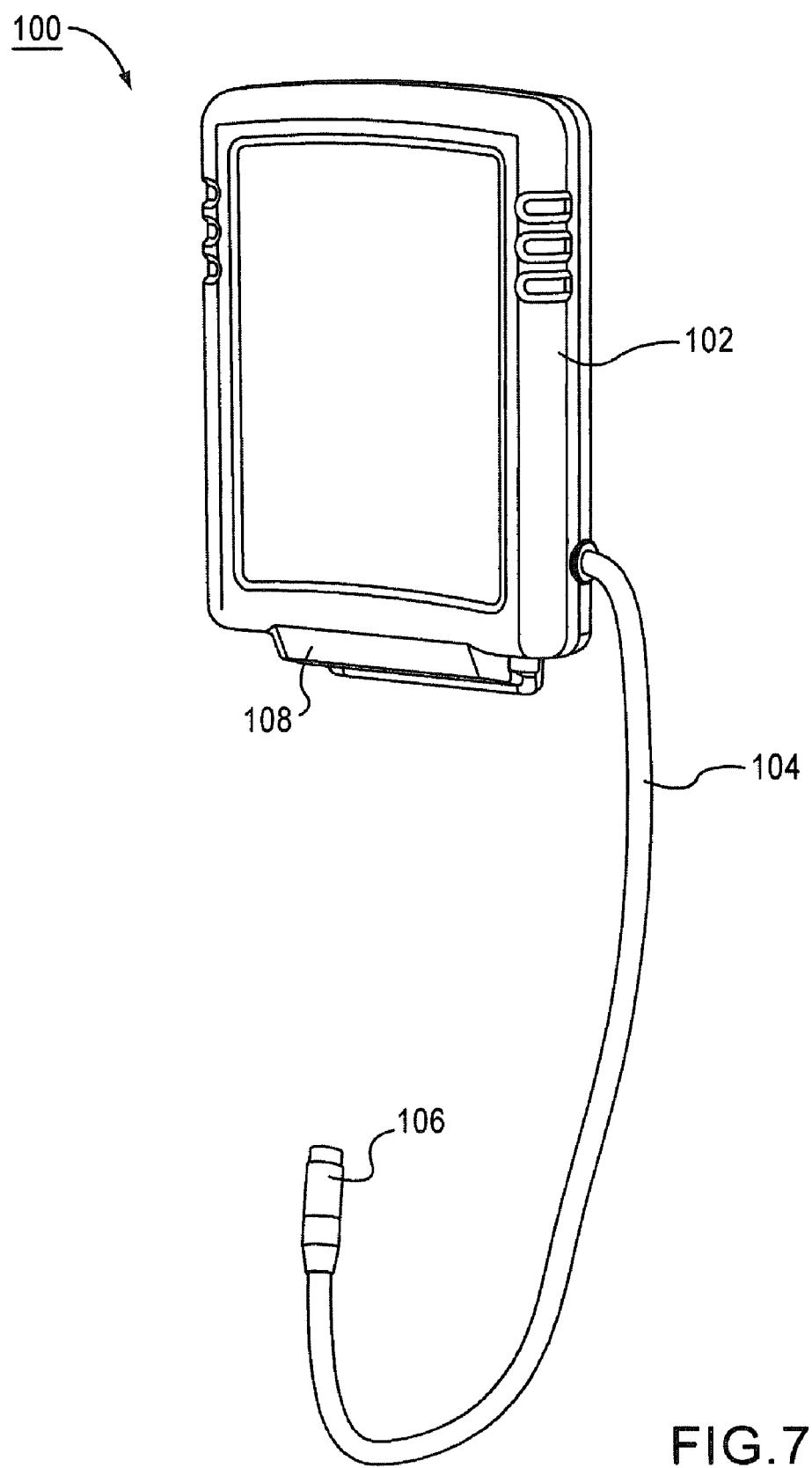
FIG. 7 is a front perspective view of a receiver module of a smart water timer.

Moisture receiving unit 100 is shown in FIG. 7. Receiver housing 102 includes clip 108 attached to it so that it can be coupled to water timer 60. Receiver cable 104 attaches connector 106 to housing 102 and receiver module 110 (shown in FIG. 8). Connector 106 attaches to timer 60, specifically at input port 70 (shown in FIG. 9).

Figure 8:
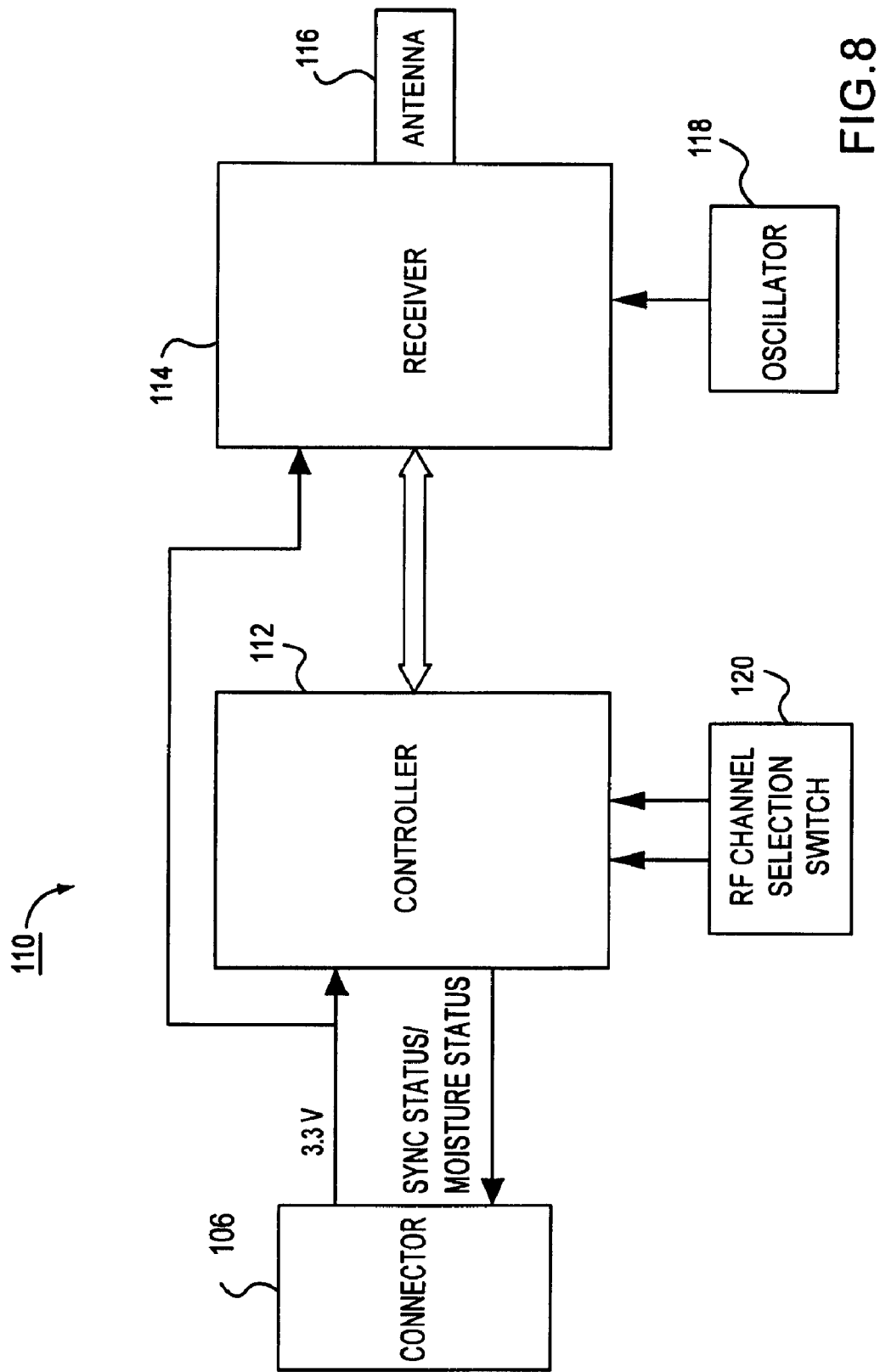
FIG. 8 is a block diagram of a receiver module.

Operation of receiver module 110 is described in FIG. 8. Receiver controller 112 is connected to receiver 114. Receiver 114 may be, for example IA 4320FSK receiver made by Integration Associates, although other receivers or transceivers known in the art will also work. Receiver controller 112 is also connected to connector 106, which attaches to water timer 60 (described later). As discussed above, a receiver and transmitter may be paired together. This allows a user to more easily set up and install a smart water timer because once the units are powered-up, the receiver module 110 automatically recognizes the signal sent by soil moisture sensor 20.

However, a receiver RF channel selection switch 120 may also be used (net shown in FIG. 8) to select a frequency in which to communicate with transmitter 32. The receiver module 110 should be set to receive the same channel as the channel selected to be broadcast in the soil moisture sensor control module 31 (via RF channel selection switch 33).

Receiver 114 receives a signal transmitted from the transmitter 32 located in the soil moisture sensor 20. Antenna 116 is used in conjunction with receiver 114 in order to increase the amplitude of the signal received from transmitter 32. A single 10 MHz parallel mode crystal 118 may be used by the receiver 114 and may have less than 300 Ohms ESR. Minimal ESR is desired for faster startup times. Upon receiving a signal, receiver 114 processes the signal and transmits the signal information to receiver controller 112. For example, when the soil moisture sensor unit transmits a signal, a series of three, 1 ms pulses are generated. After the pulses are sent, a pre-determined period of time passes and the data signal is sent.

Once the data is received by receiver 114, data is sent to water timer 60 via receiver cable 104. Receiver cable 104 has three (3) channels, a data channel, a power channel, and a ground channel. The power channel supplies 3.3 VDC power to receiver unit 100. The data channel transmits the data received from the soil moisture sensor 20. Data is passed through receiver cable 104 to receiver connector 106. Receiver connector 106 plugs into input port 70 of water timer 60.

Receiver unit 100 includes receiver clip 108, which allows a stable connection to water timer 60. Thus, in order to set up receiver unit 100 with water timer 60, a user must only plug receiver connector 106 into input port 70 and attach receiver clip 108 to water timer 60. This allows for a quick and easy installment process.

In another embodiment receiver unit 100 may be built in, or integrated with, water timer 60. Thus, the water timer and receiver could be one integral unit, reducing manufacturing cost. One drawback of this feature is the higher cost for the water timer 60 because receiver unit 100 would also be part of the unit.

In another embodiment, a receiver unit 100 could operate by receiving multiple inputs from multiple soil moisture sensing units 20. For example, a user may want to place two or more soil moisture sensors 20 in the lawn. If one of the probes indicates the moisture of the soil is higher than a selected value, a signal would be sent to water timer 60 to not allow watering of the lawn. The receiver unit 100 is thus capable of accepting a plurality of signals from various soil moisture sensors. As such, receiver unit 100 could also control multiple valves of water timer 60, allowing asynchronous watering of an area to be watered.

Timer

Figure 9:
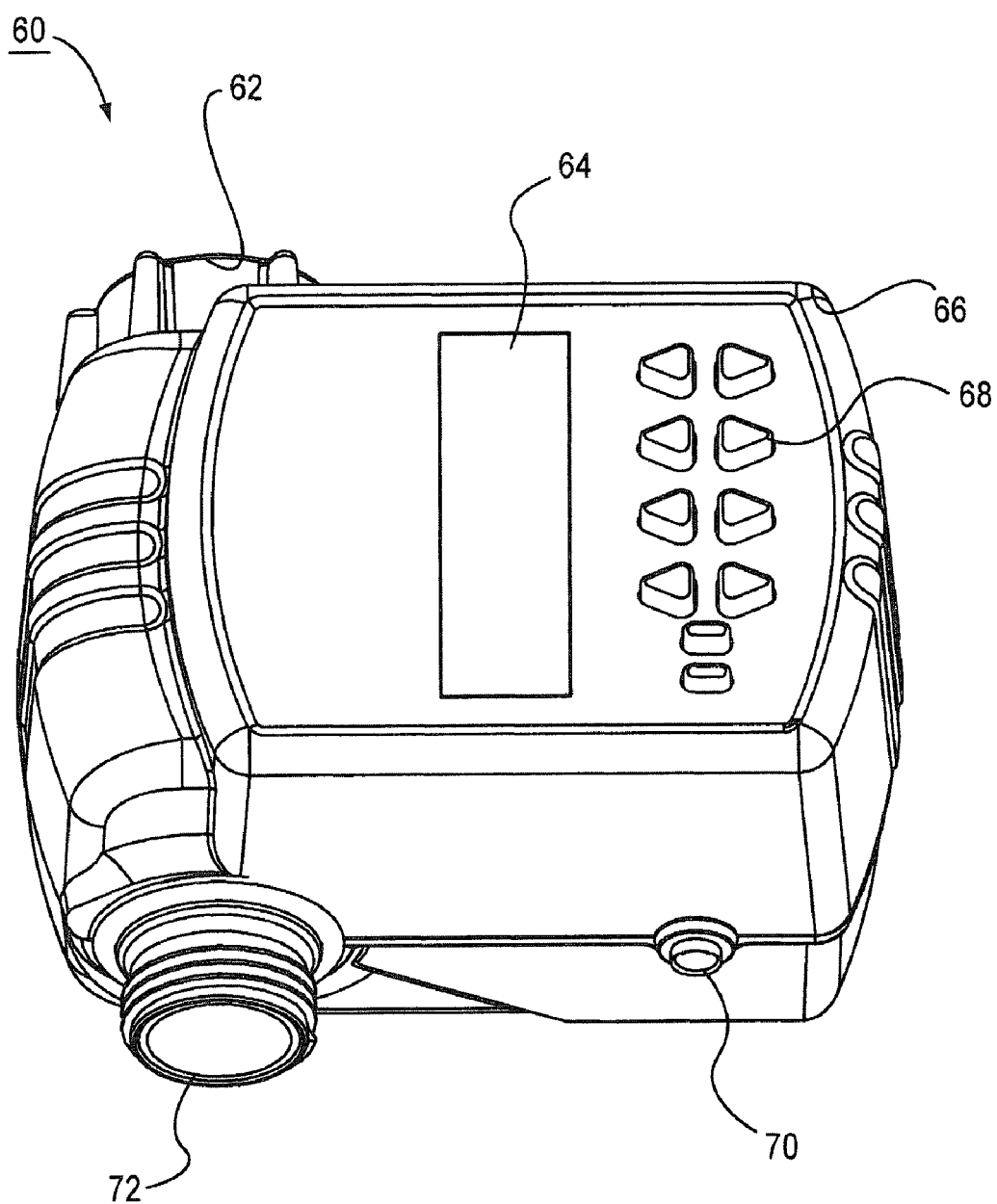
FIG. 9 is a front perspective view of a water timer and
FIG. 10 is a flowchart of an operation sequence of a water timer.

FIG. 9 shows a water timer 60. Such a water timer could be for example, Melnor Electronic AquaTimer™ 3015 or Melnor Electronic AquaTimer™ 3060. Water timer 60 has a water inlet 62 and a water outlet 72. Water inlet 62 is connected to a water source 160 (shown in FIG. 1) and water outlet 72 is typically connected to a garden hose which is in turn connected to a watering device such as sprinkler 140. Water timer 60 also has control buttons 68 in order to set and operate the water timer 60, as well as a display 64. The display 64 may be a light emitting diode display (LED), liquid crystal display (LCD), organic light emitting diode (OLED) or any other suitable display. Water timer 60 is housed in a timer housing 66.

Water timer 60 also has an input port 70 for receiving connector 106 from receiver unit 100. This allows communication between water timer 60 and receiver unit 100.

Figure 10:
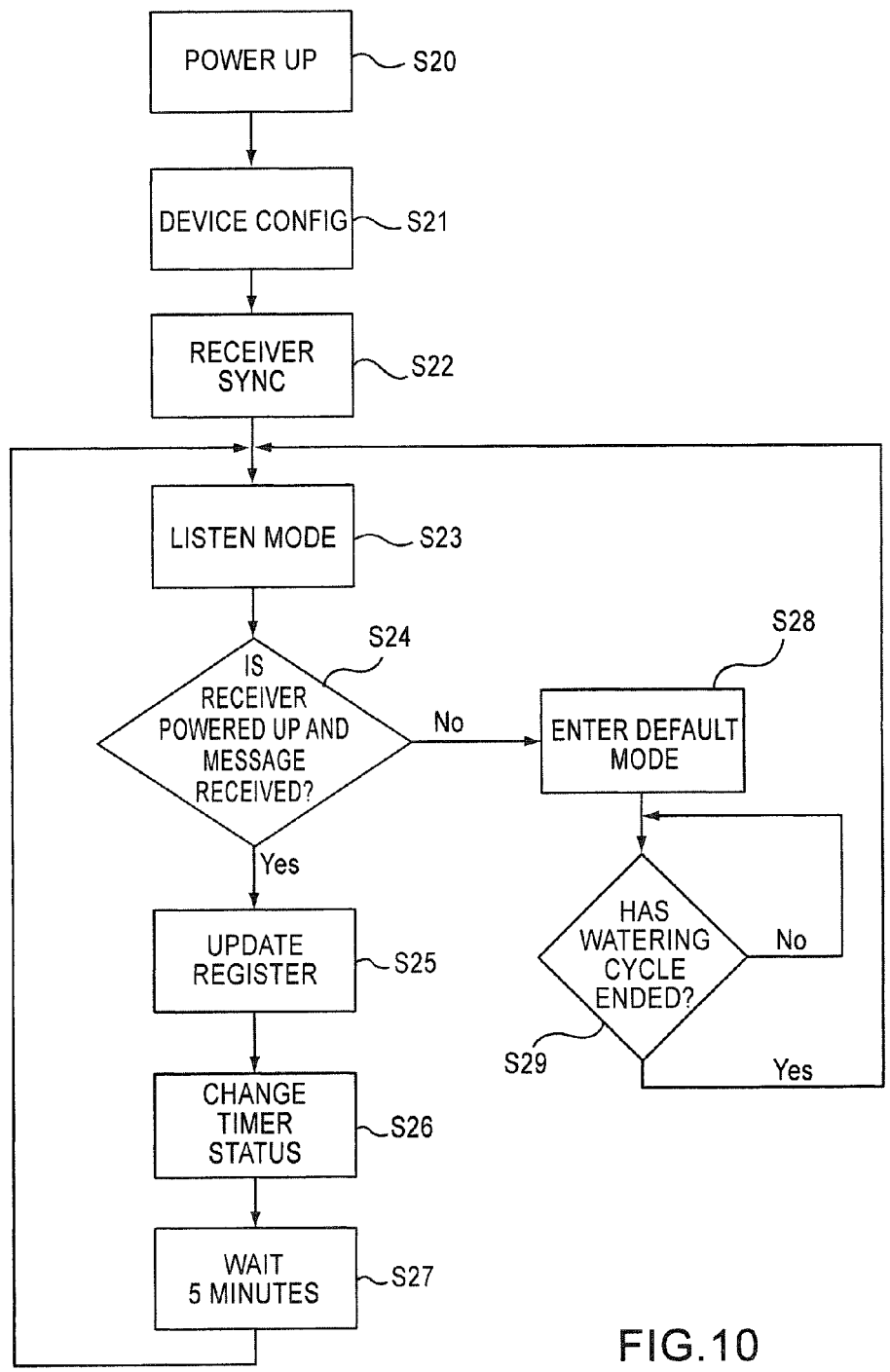

FIG. 10 shows how water timer 60 operates when connected to receiver unit 100. Step 20 shows a power up state when the water timer 60 is turned on. When water timer 60 is powered-up, power is also sent to receiver unit 100 via the power channel in receiver cable 104. In step 21, water timer 60 goes through a device configuration and in step 22, synchronizes with receiver unit 100. Once the receiver unit 100 synchronizes with water timer 60, the water timer 60 enters a listening mode in step 23.

In the listening mode, the water timer 60 determines whether or not a message has been received from the receiver unit 100 (e.g., step 24). In the listening mode, the water timer 60 checks the status of any received message immediately before a watering cycle is about to begin or during the watering cycle itself (e.g., between 1 minute and 1 ns before the water timer is scheduled to come on). If no message is received, the water timer 60 goes into a default mode in step 28. In default mode, the water timer 60 operates without any input from soil moisture sensor 20, or receiver unit 100. In other words, water timer 60 turns on a water supply when the timer indicates it is appropriate to do so. An image of a flashing antenna may also be displayed, indicating no signal from soil moisture sensor 20 has been received.

Once water timer 60 finishes watering, it will then look for a signal from receiver unit 100 indicating a data signal from soil moisture sensor 20, shown in step 29. If no signal is received, water timer 60 will again enter a default mode and continue operating without any input from the soil moisture sensor 20, as shown in step 28.

If a message has been received from soil moisture sensor 20, display 64 may output an image of an antenna indicating communication with soil moisture sensor 20. In step 25, a moisture status register is updated indicting the moisture status of the soil. Next, in step 26, the water timer status is updated to reflect the moisture status of the soil.

Water timer 60 checks the status of the received data from the soil moisture sensor 20 once every five minutes, while the water timer 60 is in a watering cycle. Water timer 60 checks once every five minutes for two of the following reasons. First, is that if soil moisture sensor 20 indicates that the moisture of the soil has reached the desired value while the sprinkler 140 is watering the lawn, water timer 60 can turn off the water supply, thereby turning off the sprinkler 140. Thus, if a rainstorm starts after the sprinkler 140 comes on, the smart water timer 1 can still turn off the water supply and the sprinkler after receiving the status of the soil moisture, no later than 5 minutes after the sprinkler has turned on.

Additionally, the water timer 60 does not check the status of the data signal too often, in order to conserve power. The inventors have set the water timer to check once every 5 minutes (e.g., step 27) if the water timer is on, but this time interval can of course be varied.

In another embodiment, a timer 60 may have multiple output valves. These output valves may also be programmable. Such a timer could be used, for example, with multiple soil moisture sensors 20. Each sensor could be placed in a different part of an area to be watered and indicate a different desired moisture level.

For example, one soil moisture sensor could be placed in a lawn, another in a tomato garden and another in a flower garden. Each soil moisture sensor could be affiliated with a different programmable valve of water timer 60 and have its own affiliated sprinkler. This would allow the user to customize the desired soil moisture level of each area to be watered, all based on a single water source and valve.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

We claim:

1. A smart water timer system for controlling an amount of water delivered to a lawn, said smart water timer system comprising:
   a controller for opening and closing a water valve,
   a receiving unit in communication with the controller, and
   a moisture sensing unit in wireless communication with the receiving unit; wherein
   the moisture sensing unit comprises a selection means for a user to select a desired soil moisture range,
   wherein said controller is a water timer and said water valve is positioned inside said water timer.

2. The smart water timer system according to claim 1, wherein the moisture sensing unit measures a soil moisture content and transmits a message to the receiving unit at predetermined time intervals.

3. The smart water timer system according to claim 1, wherein the receiving unit sends a message to the controller instructing the controller to turn off or remain off.

4. The smart water timer system according to claim 1 wherein a plurality of moisture sensing units are used with the controller such that the plurality of moisture sensing units corresponds to a plurality of output valves.

5. The smart water timer system according to claim 1, wherein the receiving unit and the controller are modular units.

6. The smart water timer system according to claim 1, said smart water timer system further comprising a lawn watering device operably connected to the controller.

7. The smart water timer system according to claim 1, wherein the moisture sensing unit measures a soil moisture content of a soil and transmits a data message to the receiving unit indicating whether or not the controller should be allowed to turn on a lawn watering device.

8. The smart water timer system according to claim 7, wherein the data message is only one bit.

9. The smart water timer system according to claim 1, wherein the moisture sensing unit comprises a capacitive soil moisture sensor.

10. The smart water timer system according to claim 1, wherein the controller has a plurality of output valves.

11. A method of using a smart water timer system for controlling the amount of water delivered to a lawn, said smart water timer system comprising:
- a controller for opening and closing a water valve, wherein said controller is a water timer and said water valve is positioned inside said water timer
- a receiving unit in communication with the controller, and
- a moisture sensing unit in wireless communication with the receiving unit; wherein said moisture sensing unit comprises a selection means for a user to select a desired soil moisture range, wherein said method comprising the steps of:
- setting a desired soil moisture range on a soil moisture sensor; and
- placing the soil moisture sensor in the area to be sensed, wherein
- the soil moisture sensor wirelessly transmits a data signal to a receiver, and
- the receiver relays a message to a water timer indicating whether or not the water timer should turn off or remain off.

12. A soil moisture sensing unit comprising:
- a housing;
- a soil moisture sensor in communication with a soil;
- a transmitter in communication with the soil moisture sensor; and
- an adjustment mechanism to select a desired soil moisture range of the soil, the adjustment mechanism in communication with the soil moisture sensor, wherein the transmitter sends a signal every 15 seconds after the sensor is turned on.

13. The soil moisture sensing unit according to claim 12, wherein the housing comprises:
- a bottom portion comprising the soil moisture sensor; and
- an upper portion comprising the transmitter and the adjustment mechanism.

14. The soil moisture sensing unit according to claim 12, wherein the soil moisture sensing unit compares input data from the soil moisture sensor with input data from the adjustment mechanism and determines whether or not the soil is above the desired soil moisture range selected.

15. The soil moisture sensing unit according to claim 12 wherein the transmitter transmits a data message indicating that a soil moisture is more or less than a maximum of the desired soil moisture range selected with the adjustment mechanism.

16. The soil moisture sensing unit according to claim 12, wherein the soil moisture sensor is a capacitance probe.

17. The soil moisture sensing unit according to claim 16, wherein the capacitance probe comprises traces formed on a printed wire board.

18. The soil moisture sensing unit according to claim 16, wherein the capacitance probe comprises electrodes positioned generally horizontal to the soil.

19. The soil moisture sensing unit according to claim 12 wherein the adjustment mechanism is a rotary switch.

* * * * *